US007070366B2

(12) United States Patent
Reichenberger et al.

(10) Patent No.: US 7,070,366 B2
(45) Date of Patent: Jul. 4, 2006

(54) DRILL STAND FOR A CORE DRILLING MACHINE

(75) Inventors: Thomas Reichenberger, Kaufering (DE); Rudolf Reitberger, Munich (DE); Stefan Hammerstingl, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 275 days.

(21) Appl. No.: 10/616,544

(22) Filed: Jul. 9, 2003

(65) Prior Publication Data

US 2004/0009045 A1 Jan. 15, 2004

(30) Foreign Application Priority Data

Jul. 12, 2002 (DE) ............................... 102 31 878

(51) Int. Cl.
*B23B 47/18* (2006.01)

(52) U.S. Cl. ......................... 408/76; 408/88; 408/111; 408/236

(58) Field of Classification Search .................. 408/76, 408/79, 88, 110–112, 236, 237; B23B 47/18
See application file for complete search history.

(56) References Cited

U.S. PATENT DOCUMENTS

| | | | | |
|---|---|---|---|---|
| 3,596,558 | A * | 8/1971 | Rydell | 409/178 |
| 4,141,151 | A * | 2/1979 | Jansky | 33/334 |
| 4,468,159 | A * | 8/1984 | Oster | 408/56 |
| 4,582,460 | A * | 4/1986 | Silverberg et al. | 409/175 |
| 5,165,827 | A * | 11/1992 | Miller | 408/16 |
| 5,342,153 | A * | 8/1994 | Dobkins | 408/1 R |
| 5,807,034 | A * | 9/1998 | Perlmutter et al. | 408/67 |
| 5,915,894 | A * | 6/1999 | Okada et al. | 408/204 |
| 6,296,426 | B1 * | 10/2001 | King et al. | 408/76 |
| 6,364,580 | B1 * | 4/2002 | Dils et al. | 408/16 |
| 6,516,842 | B1 * | 2/2003 | Chang | 144/74 |

FOREIGN PATENT DOCUMENTS

| | | | |
|---|---|---|---|
| DE | 7432872 | | 2/1975 |
| DE | 3607486 | A1 * | 9/1987 |
| DE | 0064173 | | 6/2002 |
| JP | 60039006 | A * | 2/1985 |
| JP | 08066919 | A * | 3/1996 |
| JP | 200188117 | A * | 4/2001 |
| JP | 2003136525 | A * | 5/2003 |
| WO | 9852723 | | 11/1998 |

* cited by examiner

*Primary Examiner*—Boyer D. Ashley
*Assistant Examiner*—J Williams
(74) *Attorney, Agent, or Firm*—Abelman, Frayne & Schwab

(57) ABSTRACT

A drill stand for a core drilling machine (1) for driving an annular core bit (2) rotatable about a rotational axis (A) has a base plate formed of a post plate (3) and a vacuum plate (6) securable with each other with a possibility of displacement relative to each other in a plane (E) separating the post and vacuum plates (3,6), at least one post (5), an attachment element (4) for securing the post (5) on the post plate (3); and a vacuum planar attachment element (7) for mounting the base plate on a surface.

11 Claims, 2 Drawing Sheets

DRILL STAND FOR A CORE DRILLING MACHINE

BACKGROUND OF THE INVENTION

1. Field of the Invention

The present invention relates to a portable drill stand for a core drilling machine for driving an annular core bit, preferably, for drilling concrete and masonry.

2. Description of the Prior Act

Because core drilling necessitates high torques and high displacement forces, the drill stand is usually mounted on a surface of a drilled constructional component.

German Publication DE-36 03 847 discloses a drill stand having a one-piece base plate on which stand posts and a vacuum suction cup are mounted. Upon the drill stand being secured on the constructional component with the vacuum suction cup, the position of the rotational axis of the annular core bit is precisely defined, which does not permit any further adjustment of the core drilling.

German Publication DE-197 31 773 discloses a portable drill stand having a one-piece base plate with an elongate opening and a tap bolt displaceable therein for an adjustable mounting of the base plate on the surface of the drilled constructional component. For securing a stand post on the base plate two support blocks are provided. The attachment of the drill stand with the preliminary set, tap bolt is expensive and, moreover, leads to the damage of the surface the drill stand is mounted on.

Accordingly, an object of the present invention is a drill stand that can easily be mounted on a constructional component and which would insure an easy adjustment of the core drilling.

SUMMARY OF THE INVENTION

This and other objects of the present invention, which will become apparent hereinafter, are achieved by providing a portable drill stand for a core drilling machine for driving an annular core bit rotatable about a rotational axis, with the drill stand including a base plate formed of a post plate and a vacuum plate securable with each other with a possibility of displacement relative to each other in a plane separating the post and vacuum plates, post for supporting the core drilling machine, attachment means for securing the post on the post plate, and vacuum planar attachment means for mounting the vacuum plate on a surface.

By forming a base plate of two plates, a post plate and a vacuum plate securable with each other with a possibility of displacement relative to each other, on one hand, an easy mounting on a surface, by using the vacuum planar attachment means with which the vacuum plate is equipped, is insured and on the other hand, the position of the core drilling can easily be adjusted by displacing the post and vacuum plates relative to each other in a plane separating the two plates.

Advantageously, the post and vacuum plates are secured to each other with a locking bolt that, advantageously, extends through an elongate opening formed in the post plate and extending radially to the rotational axis of the annular core bit. The use of the locking bolt extendable through an elongate opening provides for a limited displacement of the plates relative to each other in a longitudinal direction of the plates and for limited pivotal movement of the post plate relative to the vacuum plate about an axis defined by the locking bolt.

Advantageously, the locking bolt is provided with a lever knob which permits locking and unlocking of the bolt without the use of any auxiliary instrument.

Advantageously, the post plate has at least two alignment elements preferably formed as alignment screws. The provision of two alignment screws on the post plate, together with the vacuum planar attachment means of the vacuum plate, provides for a stable, planar, three-point support of the drill stand which enables a precise adjustment of the drilling direction.

Advantageously, the post plate has levelling means, such as a boxed air level, which insures maintaining of horizontal and perpendicular drilling directions.

Advantageously, there are provided two, spaced from each other and extending parallel to each other, stand posts arranged circumferentially and symmetrically with respect to the rotational axis of the annular core bit. This permits to obtain a high torsional planar torque with respect to the rotational axis of the annular core bit at a small cross-section of the stand post. Thus, at a small weight of the drill stand, an adequate torsional stiffness is insured upon transmission of a high torque from the annular core bit via the core drilling machine and the drill stand to the stand-supporting surface.

Advantageously, the post plate has a concave recess open toward the rotational axis of the annular core bit. Thereby, sufficient free space is provided for the annular core bit.

Advantageously, a side of the post plate adjacent to the vacuum plate is shaped as a segment of a circle. Thereby, an angular displacement of the post plate relative to the vacuum plate can be effected in a greater angular region.

The novel features of the present invention, which are considered as characteristic for the invention, are set forth in the appended claims. The invention itself, however both as to its construction and its mode of operation, together with additional advantages and objects thereof, will be best understood from the following detailed description of the preferred embodiment, when read with reference to the accompanying drawings.

DETAILED DESCRIPTION OF THE PREFERRED EMBODIMENT

Figure 1:
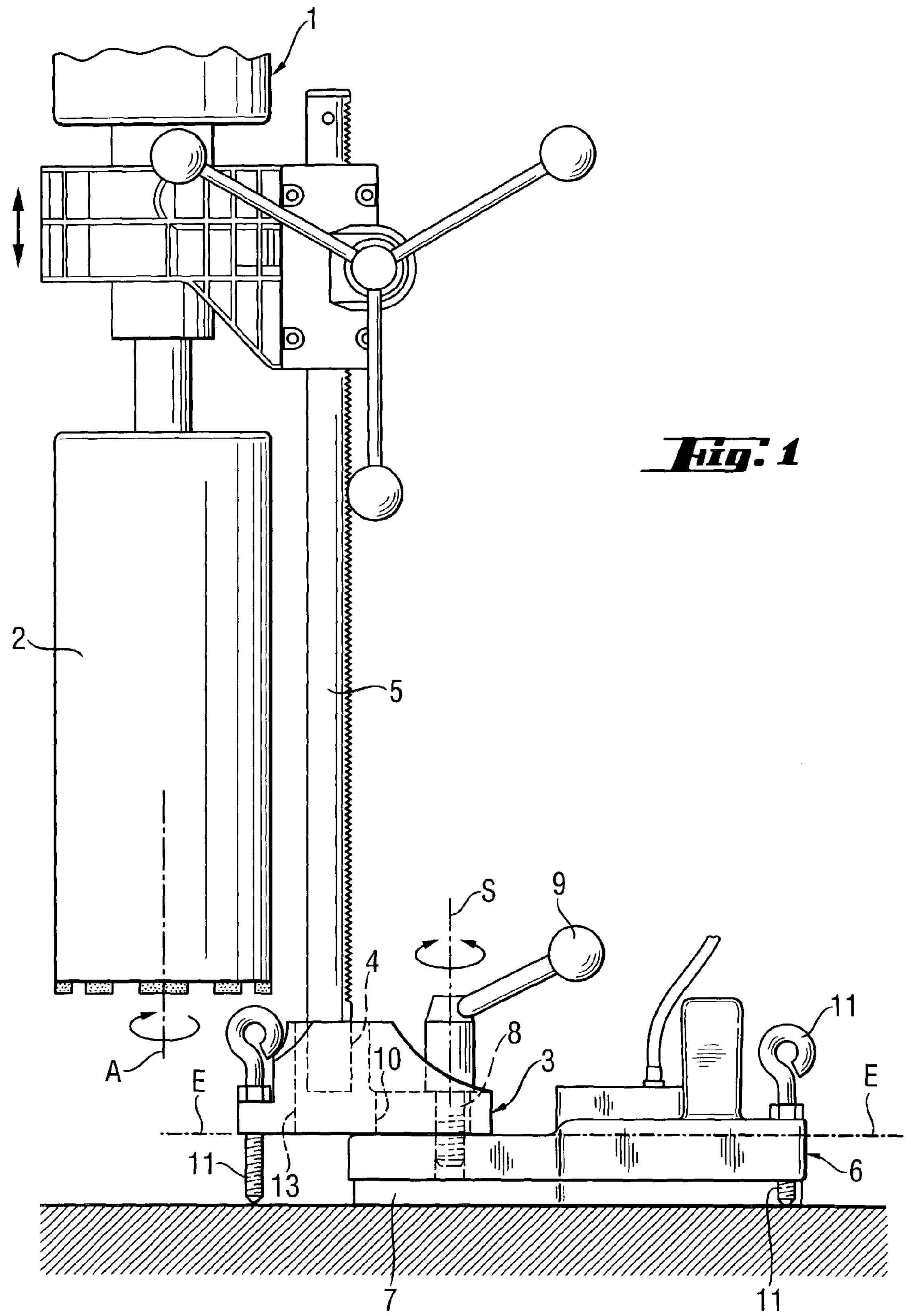
FIG. 1 a side view of a drill stand according to the present invention for a core drilling machine.

FIG. 1 shows a portable drill stand according to the present invention for a core drilling machine 1 having an annular core bit 2 rotatable about a rotational axis A. The drill stand has a two-part base plate formed of a post plate 3 and a vacuum plate 6. The post plate 3 has a deflection-resistant post-receiving means in form of post attachment means 4 for an upright stand post 5. The vacuum plate 6 has a suction ring in form of vacuum planar attachment means 7. The post plate 3 and the vacuum plate 6 are frictionally securable to each other with a possibility of displacement relative to each other along a plane E and of rotation relative to each other about an axis S extending substantially perpendicular to the plane E. To this end, there is provided a locking bolt 8 coaxial with the axis S and extending through the post plate 3. The bolt 8 has a lever knob 9. Both, the post plate 3 and the vacuum plate 6 each has alignment means 11 in form of alignment screws longitudinally adjustable along surface normals to the plane E.

Figure 2:
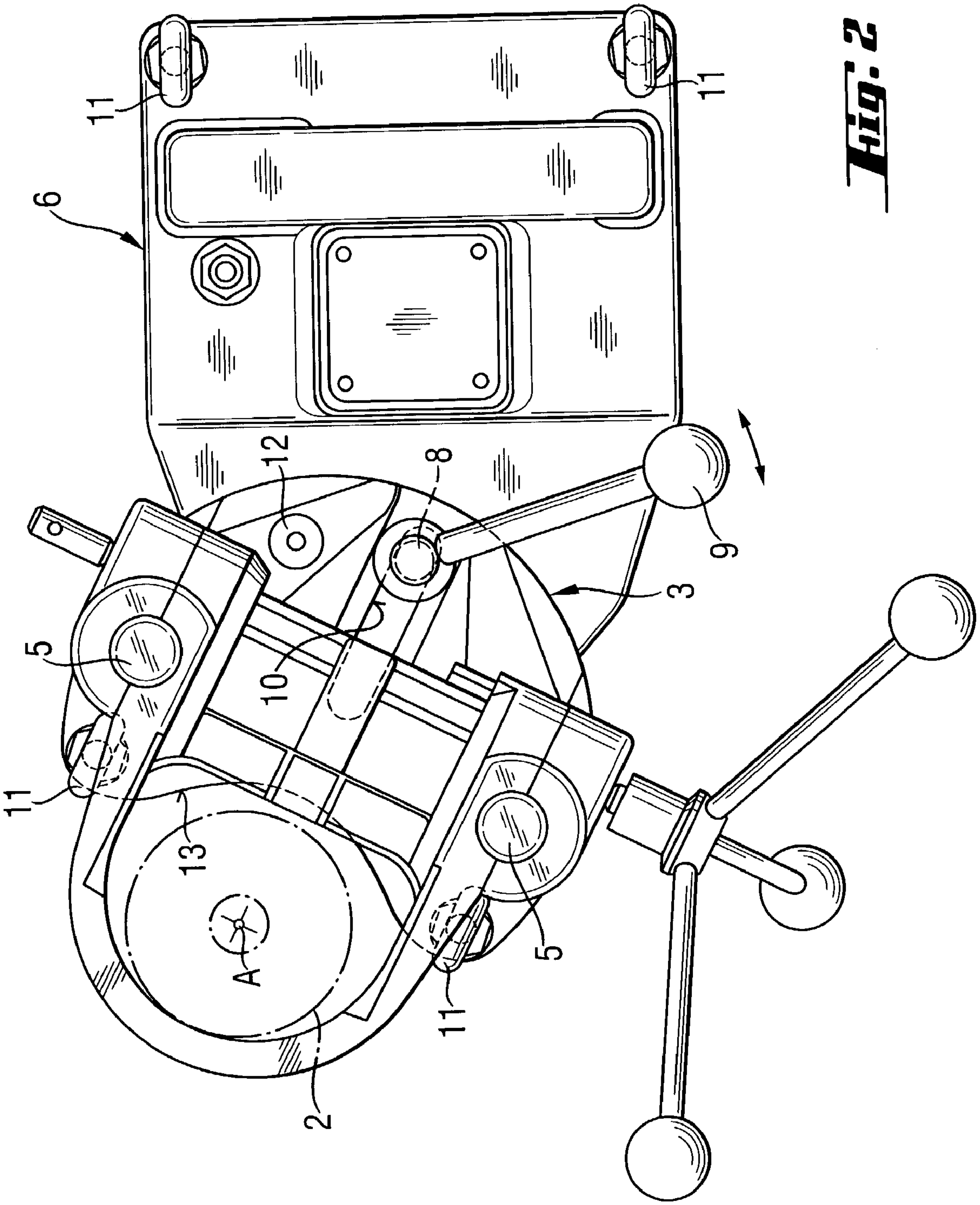
FIG. 2 a top view of the drill stand.

As shown in FIG. 2, the locking bolt 8 extends through an elongate opening 10 extending radially with respect to the rotational axis A of the annular core bit 2. The pivotal post plate 3 and the vacuum plate 6 both have an alignment element 11 in the form of an alignment or adjustment screw. The post plate 3 has a boxed air level in form of levelling means 12. The side of the post plate 3 adjacent to the vacuum plate 6 is shaped as a segment of a circle. On the post plate 3, there are mounted, symmetrically with respect to the rotational axis A of the annular core bit 2, two, spaced from each other and extending parallel to each other, upright posts 5. The post plate 3 further has a concave recess 13 open toward the rotational axis A of the annular core bit 2.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the append claims.

What is claimed is:

1. A drill stand for a core drilling machine (1) for driving an annular core bit (2) rotatable about a rotational axis (A), the drill stand comprising post (5) for supporting the core drilling machine (1); a base plate for supporting the post (5) and extending in a plane (E) extending substantially transverse to the rotational axis (A) of the core bit (2), the base plate being formed of a post plate (3) and a vacuum plate (6) securable with each other with a possibility of both linear displacement relative to each other in the place (E) the base plate extends, and pivotal movement relative to each other; post attachment means (4) for securing the post (5) on the post plate (3) and linearly displaceable in the plane of the base plate; and vacuum attachment means (7) for mounting the vacuum plate (6) and, thereby, the base plate on a surface, wherein the post (5) comprises two upright posts (5), spaced from each other and extending parallel to each other and being arranged circumferentially with respect to the rotational axis (A) of the annular core bit (2).

2. A drill stand according to claim 1, further comprising a locking bolt (8) for frictionally positively securing the post plate (3) on the vacuum plate (6).

3. A drill stand according to claim 2, wherein the post plate (3) has an elongate opening (10) extending radially to the rotational axis (A) of the annular core bit (2), and the locking bolt (8) extends through the elongate opening (10).

4. A drill stand according to claim 2, wherein the locking bolt (8) has a lever knob (9).

5. A drill stand according to claim 1, wherein the post plate (3) has at least two alignment elements (11) longitudinally adjustable along surface normals to the separating plane (E).

6. A drill stand according to claim 5, wherein the alignment elements (11) are formed as alignment screws.

7. A drill stand according to claim 1, wherein the post plate (3) includes leveling means (12).

8. A drill stand according to claim 7, wherein the leveling means (12) is a boxed air level.

9. A drill stand according to claim 1, wherein the two stand post (5) are arranged symmetrically to each other with respect to the rotational axis (A) of the annular core bit (2).

10. A drill stand for a core drilling machine (1) for driving an annular core bit (2) rotatable about a rotational axis (A), the drill stand comprising post (5) for supporting the core drilling machine (1); a base plate for supporting the post (5) and extending in a plane (E) extending substantially transverse to the rotational axis (A) of the core bit (2), the base plate being formed of a post plate (3) and a vacuum plate (6) securable with each other with a possibility of both linear displacement relative to each other in the plane (E) the base plate extends, and pivotal movement relative to each other; post attachment means (4) for securing the post (5) on the post plate (3) and linearly displaceable in the plane of the base plate; and vacuum attachment means (7) for mounting the vacuum plate (6) and, thereby, the base plate on a surface, wherein the post plate (3) has a concave recess (13) open toward the rotational axis (A) of the annular core bit (2).

11. A drill stand for a core drilling machine (1) for driving an annular core bit (2) rotatable about a rotational axis (A), the drill stand comprising post (5) for supporting the core drilling machine (1); a base plate for supporting the post (5) and extending in a plane (E) extending substantially transverse to the rotational axis (A) of the core bit (2), the base plate being formed of a post plate (3) and a vacuum plate (6) securable with each other with a possibility of both linear displacement relative to each other in the plane (E) the base plate extends, and pivotal movement relative to each other; post attachment means (4) for securing the post (5) on the post plate (3) and linearly displaceable in the plane of the base plate; and vacuum attachment means (7) for mounting the vacuum plate (6) and, thereby, the base plate on a surface, wherein a side of the post plate (3) adjacent to the vacuum plate (6) is shaped as a segment of a circle.

* * * * *